(12) United States Patent
Kaltenbach et al.

(10) Patent No.: US 12,123,483 B2
(45) Date of Patent: Oct. 22, 2024

(54) MOTOR VEHICLE TRANSMISSION FOR AN AT LEAST PARTIALLY ELECTRICALLY DRIVEN MOTOR VEHICLE

(71) Applicant: ZF Friedrichshafen AG, Friedrichshafen (DE)

(72) Inventors: Johannes Kaltenbach, Friedrichshafen (DE); Thomas Martin, Weissensberg (DE); Kai Bornträger, Langenargen (DE); Johannes Glückler, Friedrichshafen (DE); Stefan Renner, Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/240,540

(22) Filed: Aug. 31, 2023

(65) Prior Publication Data
US 2024/0068544 A1 Feb. 29, 2024

(30) Foreign Application Priority Data
Aug. 31, 2022 (DE) .................... 10 2022 209 058.6

(51) Int. Cl.
*F16H 3/64* (2006.01)
*B60K 1/00* (2006.01)
*B60K 17/08* (2006.01)

(52) U.S. Cl.
CPC ............. *F16H 3/64* (2013.01); *B60K 1/00* (2013.01); *B60K 17/08* (2013.01); *F16H 2200/0021* (2013.01); *F16H 2200/0039* (2013.01); *F16H 2200/2007* (2013.01); *F16H 2200/2094* (2013.01)

(58) Field of Classification Search
CPC .............. F16H 3/64; F16H 2200/0021; F16H 2200/0039; F16H 2200/2007; F16H 2200/2094; B60K 1/00; B60K 17/08; B60K 2001/001; B60K 2007/0038; B60K 2007/0061; B60K 2007/0092
See application file for complete search history.

(56) References Cited

U.S. PATENT DOCUMENTS 5,168,946 A 12/1992 Dorgan
5,447,478 A 9/1995 Braun
(Continued)

FOREIGN PATENT DOCUMENTS

AT 233406 5/1964
DE 1 177 671 9/1964
(Continued)

OTHER PUBLICATIONS

German Patent Office, Search Report issued in German patent application No. 10 2022 209 058.6 (May 16, 2023).

*Primary Examiner* — Derek D Knight
(74) *Attorney, Agent, or Firm* — Finch & Maloney PLLC (57) ABSTRACT

A motor vehicle transmission (1) has a drive input shaft (15), a drive output shaft (16) and a first planetary gearset (P1), and a second planetary gearset (P2), where the drive input shaft (15) is provided for coupling to a drive machine. In addition, a first shifting element (A) and a second shifting element (B) are provided, at least functionally. Also disclosed are a drive unit (5), a motor vehicle drivetrain, a hybrid or electric vehicle, and a method for operating a motor vehicle transmission.

17 Claims, 4 Drawing Sheets

(56) References Cited

U.S. PATENT DOCUMENTS

| | | |
|---|---|---|
| 6,139,464 A | 10/2000 | Roske |
| 7,422,535 B2 | 9/2008 | Raghavan et al. |
| 8,640,801 B2 | 2/2014 | Hennings et al. |
| 8,870,707 B2 | 10/2014 | Mauer et al. |
| 9,242,555 B2 | 1/2016 | Wenthen |
| 9,334,930 B2 | 5/2016 | Kaltenbach |
| 9,447,848 B2 | 9/2016 | Beck et al. |
| 11,124,064 B2 | 9/2021 | Kaltenbach et al. |
| 2005/0148421 A1 | 7/2005 | Keuth |
| 2010/0190602 A1 | 7/2010 | Wittkopp et al. |
| 2012/0258831 A1 | 10/2012 | Knoblauch et al. |
| 2017/0175863 A1 | 6/2017 | Kramer et al. |
| 2017/0204942 A1 | 7/2017 | Luchi et al. |
| 2020/0282827 A1* | 9/2020 | Kaltenbach ............ B60K 17/06 |

FOREIGN PATENT DOCUMENTS

| | | |
|---|---|---|
| DE | 103 33 433 A1 | 2/2005 |
| DE | 10 2008 031 456 A1 | 1/2010 |
| DE | 10 2008 063 533 A1 | 7/2010 |
| DE | 10 2009 002 437 A1 | 10/2010 |
| DE | 10 2012 216 228 A1 | 3/2014 |
| DE | 10 2013 226 471 A1 | 6/2015 |
| DE | 10 2017 111 051 B3 | 6/2018 |
| DE | 10 2018 000 187 A1 | 8/2019 |
| DE | 10 2019 202 208 A1 | 8/2020 |
| DE | 10 2019 131 764 A1 | 5/2021 |
| DE | 102019131763 A1 * | 5/2021 |
| DE | 102019131765 A1 * | 5/2021 |
| EP | 0 618 382 A1 | 10/1994 |
| GB | 1 217 364 | 12/1970 |
| JP | 2013-160248 A | 8/2013 |
| WO | 2013/177785 A1 | 12/2013 |
| WO | 2019/115204 A1 | 6/2019 |

\* cited by examiner

|    | A | B | C |
|----|---|---|---|
| G1 | x |   |   |
| G2 |   | x |   |
| G3 |   |   | x |

Fig. 4

|     | A | B | C |
|-----|---|---|---|
| G1' |   | x |   |
| G2' | x |   |   |
| G3' |   |   | x |

Fig. 5

MOTOR VEHICLE TRANSMISSION FOR AN AT LEAST PARTIALLY ELECTRICALLY DRIVEN MOTOR VEHICLE

RELATED APPLICATIONS

This application claims the benefit of and right of priority under 35 U.S.C. § 119 to German Patent Application no. 10 2022 209 058.6, filed on 31 Aug. 2022, the contents of which are incorporated herein by reference in its entirety.

FIELD OF THE DISCLOSURE

The invention relates to a motor vehicle transmission for an at least partially electrically driven motor vehicle, comprising a drive input shaft, a drive output shaft, and a first planetary gearset and a second planetary gearset, wherein the drive input shaft is provided for coupling to a drive machine, in particular an electric machine, wherein the first planetary gearset and the second planetary gearset each comprise a first element, a second element, and a third element in the form, respectively, of a sun gear, a planetary web, and a ring gear in each case, wherein a first shifting element, a second shifting element, and a third shifting element are provided at least functionally, wherein the first element of the first planetary gearset is connected rotationally fixed to the drive input shaft and the third element of the first planetary gearset is immobilized, and wherein the second element of the second planetary gearset is connected rotationally fixed to the drive output shaft. Furthermore, the invention relates to a drive unit for an at least partially electrically driven motor vehicle, a drive axle for a hybrid or electric vehicle, and a method for operating a motor vehicle transmission.

BACKGROUND

In motor vehicles made as electric or hybrid vehicles, as part of a respective drivetrain a motor vehicle transmission is provided between at least one electric machine and drive wheels of the motor vehicle concerned, in order to be able to transmit a drive movement from the at least one electric machine to the drive wheels, particularly in the slow range. Besides single-gear transmissions, for that purpose sometimes motor vehicle transmissions are used in which two or more gears can be engaged.

From DE 10 2019 202 994 A1 a drive axle of an electric vehicle is known, such that in the drive axle a drive unit with a vehicle transmission and an electric machine are provided. A rotor of the electric machine is connected rotationally fixed to a drive input shaft of the motor vehicle transmission, which besides the drive input shaft also comprises a drive output shaft, two planetary gearset, and three shifting elements. The planetary gearsets consist in each case of a plurality of elements, which in an individual planetary gearset comprise a sun gear, a planetary carrier, and a ring gear in each case. In this case the first element of the first planetary gearset is connected rotationally fixed to the drive input shaft, while the third element of the first planetary gearset is permanently immobilized. In addition, the second element of the second planetary gearset is connected rotationally fixed to the drive output shaft.

SUMMARY

Starting from the above-described prior art, the purpose of the present invention is now to provide a motor vehicle transmission for an at least partially electrically driven motor vehicle such that with the said motor vehicle transmission suitable integration of a drive machine should be possible with a smaller number of shifting elements.

This objective is achieved by a motor vehicle transmission in combination with its characterizing features, in accordance with embodiments disclosed herein. Additional advantageous further developments of the invention will be apparent in light of the present disclosure. The present disclosure is also directed to a drive unit in which a motor vehicle transmission according to the invention is provided, a drive axle for a hybrid or electric vehicle, as well as a hybrid or electric vehicle as its object. The present disclosure further relates to a method for operating a motor vehicle transmission according to the invention.

According to the invention, a motor vehicle transmission comprises a drive input shaft, a drive output shaft, and a first and a second planetary gearset. The drive input shaft is provided for coupling to a drive machine, in particular an electric machine. The first planetary gearset and the second planetary gearset comprise in each case a first element, a second element, and a third element in the form, respectively, of a sun gear, a planetary web, and a ring gear, and a first shifting element, a second shifting element and a third shifting element are provided, at least functionally. Furthermore, the first element of the first planetary gearset is connected rotationally fixed to the drive input shaft, while the third element of the first planetary gearset is immobilized. In addition, the second element of the second planetary gearset is connected rotationally fixed to the drive output shaft.

A "shaft," such as the drive input shaft or the drive output shaft, in the context of the invention is understood to mean a rotatable component of the transmission by way of which a power flow can be transmitted between components, if need be by actuating an at least functionally provided shifting element. The shaft concerned can in that case connect the components to one another axially, or radially, or even both axially and radially. Thus, the shaft concerned can constitute an intermediate component via which a particular component is connected purely radially, for example. Furthermore, depending on the shape and connections of the components or their ability to be connected thereto, the shaft concerned can be a solid shaft, a hollow shaft, or a partly solid and partly hollow shaft. Alternatively, or in addition, the shaft concerned can be made as one piece or of more than one piece.

In the context of the invention, "axial" means an orientation in the direction of a longitudinal central axis of the motor vehicle transmission, parallel to which rotation axes of shafts of the motor vehicle transmission and the elements of the planetary gearsets are orientated. Then, "radial" means an orientation in the diametral direction of a component of the transmission, in particular a particular shaft or a particular element of the planetary gearsets.

The motor vehicle transmission according to the invention comprises a drive input shaft, which in the motor vehicle transmission according to the invention is provided for forming a drive-input-side coupling to a drive machine. Particularly preferably, the drive input shaft serves for the connection of just one drive machine. For that purpose, the drive input shaft is provided with a connection point at which a coupling of the drive input shaft to the drive machine can be formed. In this case the said coupling between the drive machine and the drive input shaft is in a form such that when the motor vehicle transmission is in its installed condition there is always a fixed rotation speed ratio between the rotation speed of the drive input shaft of the motor vehicle transmission and the rotation speed of the drive machine. Thus, in the context of the invention, at least one further gear ratio step such as a spur gear stage and/or a planetary stage can be provided between the drive input shaft and the drive machine, by virtue of which pre-gearing of a rotation movement of the drive machine relative to the drive input shaft can be produced. Particularly preferably, however, the drive input shaft of the motor vehicle transmission according to the invention is connected rotationally fixed to the drive machine so that during operation the drive machine and the drive input shaft rotate at the same rotation speed.

The motor vehicle transmission is in particular a transmission for a hybrid or an electric motor vehicle, which is designed to be connected by way of its drive input shaft to a drive machine in the form of an electric machine. As described earlier, a rotor of the electric machine can be coupled via at least one intermediate gear ratio step to the drive input shaft of the motor vehicle transmission. Particularly preferably, however, when the motor vehicle transmission according to the invention has been installed, a rotor of the electric machine is connected rotationally fixed to the drive input shaft so that the rotor of the electric machine is in rotationally fixed connection with the drive input shaft.

In the motor vehicle transmission according to the invention, the drive output shaft is provided in particular in order to form a coupling of the motor vehicle transmission on the drive output side to components which, in the installed condition of the motor vehicle transmission, follow in the power-flow direction to drive wheels of the motor vehicle concerned. In this way, the drive output shaft of the motor vehicle transmission according to the invention can, in particular, be coupled to a differential gearset positioned coaxially or with its axis offset relative to the drive input shaft and the drive output shaft. Depending on the specific incorporation of the motor vehicle transmission in a drivetrain of the motor vehicle, the differential gearset can be in the form of a longitudinal or a transverse differential.

In the motor vehicle transmission according to the invention the drive input shaft and the drive output shaft are in particular arranged coaxially with one another, and it is also preferable for the planetary gearsets to be positioned coaxially with the drive input shaft and the drive output shaft. In that way a structure of the motor vehicle transmission which is more compact in the radial direction can be produced.

The planetary gearsets consist in each case of a first element, a second element, and a third element, wherein the elements of each individual planetary gearset are formed respectively by a sun gear, a planetary web, and a ring gear. Particularly preferably, each individual planetary gearset is a minus planetary gearset in which on the planetary web at least one planetary gearwheel is mounted to rotate, this at least one planetary gearwheel meshing both with the respective sun gear and with the respective ring gear. When the respective planetary gearsets are in the form of minus planetary gearsets, then the first element of the planetary gearset concerned is the sun gear, the second element of the said planetary gearset is the planetary web, and the third element of the said planetary gearset is the ring gear.

Alternatively, in principle, one or both planetary gearsets could be plus planetary gearsets. In that case, at least one planetary gearwheel pair is mounted to rotate, of whose planetary gearwheels one meshes with the sun gear and one with the ring gear concerned in each case. In addition, the planetary gearwheels of the at least one planetary gearwheel pair mesh with one another. Other than in the minus-planetary-gearset design, in this case the first element of the planetary gearset concerned is preferably the sun gear, but the second element thereof is the ring gear and the third element thereof is the planetary web. Compared with a design as a minus planetary gearset, a stationary gear ratio of the planetary gearset concerned is increased by one. As already described earlier, however, in the context of the present invention, both planetary gearsets are preferably minus planetary gearsets. Also preferably, in the motor vehicle transmission according to the invention, just two planetary gearsets are provided.

The motor vehicle transmission according to the invention has at least functionally a first shifting element, a second shifting element, and a third shifting element, by the selective actuation of which in particular various gears between the drive input shaft and the drive output shaft can be engaged. In this case, in the motor vehicle transmission according to the invention preferably exactly three shifting elements are provided, such that by means of the three shifting elements exactly three different gears can be engaged between the drive input shaft and the drive output shaft. In principle, however, within the scope of the invention, besides the first, second, and third shifting elements one or more further shifting elements could be provided, at least functionally.

In the context of the invention, that a particular shifting element is provided "at least functionally" means that in the motor vehicle transmission according to the invention at least the particular function of the shifting element concerned is reproduced. The shifting elements can actually be physically present as individual shifting elements, or their function is reproduced by some other component, such as a shifting device. A function-reproducing component can then combine the function of two or more shifting elements in a single device.

The invention is now based on the technical principle that the drive input shaft is also connected rotationally fixed to the first element of the second planetary gearset. The at least functionally provided first shifting element is designed, when closed, to connect the second element of the first planetary gearset rotationally fixed to the drive output shaft, whereas the at least functionally provided second shifting element is designed, when closed, to immobilize the third element of the second planetary gearset. Furthermore, the at least functionally provided third shifting element is designed, when closed, to connect the second element of the first planetary gearset and the third element of the second planetary gearset rotationally fixed to one another.

Correspondingly, therefore, in the motor vehicle transmission according to the invention, the first element of the first planetary gearset and the drive input shaft are permanently connected rotationally fixed to one another whereas the drive input shaft is also always connected rotationally fixed to the first element of the second planetary gearset, so that the drive input shaft, the first element of the first planetary gearset, and the first element of the second planetary gearset always rotate together. The third element of the first planetary gearset is permanently immobilized, so that the third element of the first planetary gearset is always prevented from rotating. Moreover, the second element of the second planetary gearset and the drive output shaft are always connected rotationally fixed to one another, which means that the second element of the second planetary gearset and the drive output shaft always rotate together.

In the context of the invention, the rotationally fixed connection between the respective shafts and the associated elements in each case can be realized in the form of a rotationally fixed connection of individual components, i.e., the particular shaft and the particular element of the planetary gearset concerned are present as separate components, which are in rotationally fixed connection with one another. Alternatively, however, an integral structure of the shaft concerned, i.e., the drive input shaft or the drive output shaft, and the element of the planetary gearset concerned that is connected rotationally fixed to it, can be considered.

Closing of the at least functionally provided first shifting element results in a rotationally fixed connection of the second element of the first planetary gearset to the drive output shaft, so that the second element of the first planetary gearset and the drive output shaft thereafter rotate together. On the other hand, if the at least functionally provided second shifting element is changed to its closed state, then the third element of the second planetary gearset is immobilized so that the third element of the second planetary gearset is prevented from rotating. The at least functionally provided third shifting element, when closed, ensures a rotationally fixed connection of the second element of the first planetary gearset to the third element of the second planetary gearset so that the second element of the first planetary gearset and the third element of the second planetary gearset then rotate together.

The permanently immobilized state of the third element of the first planetary gearset and the immobilization of the third element of the second planetary gearset, by means of the at least functionally provided second shifting element, take place in particular in that the element concerned is or will be connected rotationally fixed to a permanently immobilized structural element. In this case, the permanently immobilized structural element is preferably a transmission housing of the motor vehicle transmission, part of the housing, or a component connected rotationally fixed thereto. The third element of the first planetary gearset can even be made integrally with the permanently immobilized structural element.

In the case of components of the motor vehicle transmission according to the invention which are only connected rotationally fixed with one another by actuating a respective, at least functionally provided shifting element, a connection is preferably formed by way of one or more intermediate shafts. Thus, in the context of the invention, respective designs can also be considered in which the shaft concerned is made integrally with one of the two components that are to be connected in a rotationally fixed manner.

The design of a motor vehicle transmission according to the invention has the advantage that thereby a transmission with a compact structure can be produced, by means of which a suitable incorporation of a drive machine, in this case an electric machine in particular, is possible. This can be done with a small number of at least functionally provided shifting elements. In particular, in the motor vehicle transmission according to the invention, several different gears can be engaged, which can be used by the connected drive machine, such that at least one gear can be engaged in which a power flow only passes through one of the planetary gearsets. In this at least one gear, therefore, a high efficiency can be achieved.

In an embodiment of the invention, the shifting elements, at least functionally, are in the form of interlocking shifting elements which, particularly preferably, are designed as unsynchronized claw-type shifting elements. Designing the shifting elements as interlocking shifting elements has the advantage that in an open condition of the shifting element concerned, no drag losses or only very small drag losses occur at that shifting element. This improves the efficiency of the motor vehicle transmission. Alternatively, however, one or more of the shifting elements can be designed as interlocking shifting elements in the form of locking synchronizations. Another alternative is to design one or more shifting elements as frictional shifting elements, which can then particularly preferably be in the form of disk-type shifting elements. Advantageously, in that case the shifting element concerned can be actuated under load. Particularly preferably, however, the first, second, and third shifting elements, at least functionally, are in the form of interlocking shifting elements.

In a further development of the invention, the first shifting element and the third shifting element are formed by a shifting device, whose coupling element can be moved to a first shift position and to a second shift position. In the first shift position, the coupling element functionally reproduces an actuated state of the first shifting element and connects the second element of the first planetary gearset rotationally fixed to the drive output shaft. In the second shift position, the coupling element functionally reproduces an actuated state of the third shifting element and connects the second element of the first planetary gearset and the third element of the second planetary gearset rotationally fixed to one another. Reproducing the functions of the first and third shifting elements by means of a shifting device has the advantage that the respective rotationally fixed connections can be produced in a compact manner and with a small number of structural elements. Moreover, in that way, a common actuator can be used for actuating the first and third shifting elements, which reduces the production costs. Particularly preferably, between its first and second shift positions, the coupling element can be moved to an intermediate neutral position, such that in this neutral position no coupling takes place by the coupling element, so that both the first and the third shifting elements are in an open state. Also preferably, the second shifting element is then in the form of an individual shifting element whose closed state can be produced in particular with a coupling element by means of an associated actuator.

Alternatively, to the above variant of the invention, the second shifting element and the third shifting element are formed by a shifting device, whose coupling element can be moved to a first shift position and to a second shift position. In the first shift position, the coupling element reproduces an actuated state of the second shifting element and immobilizes the third element of the second planetary gearset. On the other hand, in its second shift position the coupling element reproduces an actuated state of the third shifting element and connects the second element of the first planetary gearset and the third element of the second planetary gearset rotationally fixed to one another. In this variant too, in particular between the first and second shift positions, the coupling element can move to an intermediate neutral position, such that in this neutral position no coupling takes place by the coupling element so that both the second shifting element and the third shifting element are in their open state. Also preferably, the first shifting element is then in the form of an individual shifting element whose closed state can be produced in particular with a coupling element by means of an associated actuator.

In the context of the invention, it would also be conceivable, if the connection properties of the elements permit, to reproduce the functions of the first, the second, and the third shifting elements all by a common shifting device, whose coupling element, in the respective shift positions, reproduces the actuated state of one of the shifting elements in each case. The coupling element would then have to be moved to three different shift positions and preferably, between those shift positions two neutral positions could also be adopted, in which none of the shifting elements was in an actuated state. Corresponding to an embodiment of the invention, the planetary gearsets are arranged axially at a connection point that serves for the coupling of the drive input shaft to the drive machine, axially in the sequence: first planetary gearset followed by second planetary gearset. In a further development of this embodiment, in this case the first shifting element and the third shifting element are arranged axially between the first planetary gearset and the second planetary gearset, while the first shifting element is preferably located axially between the first planetary gearset and the third shifting element.

Alternatively, or in addition to the above embodiment, the second shifting element is located axially on a side of the second planetary gearset that faces away from the first planetary gearset. Alternatively, to this variant, however, the second shifting element can also be arranged axially between the first planetary gearset and the second planetary gearset, this being done in particular if the second and third shifting elements are formed by a shifting device. In this case then, the second shifting element is preferably located axially between the third shifting element possibly formed by the shifting device and the second planetary gearset.

According to a possible design of the invention, the first planetary gearset has quantitatively a larger stationary gear ratio than the second planetary gearset. In that way suitable gear ratios can be produced by the selective actuation of the at least functionally provided shifting elements as gears between the drive input shaft and the drive output shaft.

Thus, the motor vehicle transmission according to the invention can be operated in such manner that a first gear between the drive input shaft and the drive output shaft is engaged when the first shifting element is closed. In that case the drive input shaft and therefore also the drive machine connected thereto are coupled to the drive output shaft by way of the first planetary gearset, whereas the second planetary gearset is free from load. As a result, in the first gear good efficiency is achieved. A second gear can be engaged between the drive input shaft and the drive output shaft when the second shifting element is closed. The result is that owing to the then-immobilized third element of the second planetary gearset, the drive input shaft and thus also the drive machine are coupled to the drive output shaft by way of the second planetary gearset. In this case the first planetary gearset is free from load, so that again good efficiency can be achieved. Finally, integration of the drive machine can also be realized in a third gear in which the drive input shaft is coupled to the drive output shaft by way of both planetary gearsets. For this, the third shifting element is closed.

Alternatively, the first planetary gearset has quantitatively a lower stationary gear ratio than the second planetary gearset. In that case too, three different gear ratios can be engaged as gears between the drive input shaft and the drive output shaft, although the assignments are then changed by comparison with the previous variant.

Thus, a first gear can be engaged between the drive input shaft and the drive output shaft when the second shifting element is closed. Thereby, the drive input shaft and therefore also the drive machine connected thereto is coupled to the drive output shaft by way of the second planetary gearset, whereas the first planetary gearset is free from load and in that way good efficiency is achieved. A second gear can be engaged between the drive input shaft and the drive output shaft when the first shifting element is closed, whereby the first planetary gearset couples the drive input shaft and so too the drive machine to the drive output shaft. The second planetary gearset is then free from load, so that again good efficiency is achieved. Furthermore, integration of the drive machine can also be realized in a third gear when the drive input shaft is coupled to the drive output shaft by way of both planetary gearsets. For that purpose, the third shifting element is closed.

An object of the invention is also a drive unit which, besides an electric machine, comprises a motor vehicle transmission in accordance with one or more of the above variants. In this case a rotor of the electric machine is coupled to the drive input shaft of the motor vehicle transmission. In the context of the invention, the electric machine can in particular be operated on the one hand as a generator and on the other hand as an electric motor. In that way a drive unit can be provided, which is suitable for use in a motor vehicle in the form of an electric vehicle or a hybrid vehicle.

Particularly preferably, the electric machine is arranged coaxially with the drive input shaft and the rotor of the electric machine is connected rotationally fixed to the drive input shaft. Consequently, during operation, the drive input shaft and the rotor of the electric machine rotate at the same rotation speed. Alternatively, however, it is also conceivable that the rotor of the electric machine is coupled to the drive input shaft via at least one gear ratio.

In a further development of a drive unit as discussed above, the first planetary gearset of the motor vehicle transmission is arranged axially at least partially overlapping and radially inside the rotor of the electric machine. For this, a nested structure and thus an axially shorter drive unit can be produced. If need be, in this case the first shifting element and the third shifting element, and further in some circumstances also the second shifting element can be positioned axially at the level of and radially inside the rotor of the electric machine.

A drive unit that corresponds with one or more of the above variants is in particular part of a drive axle, which is then provided for an electric or a hybrid vehicle. Preferably, the drive unit is in that case arranged in a plane with drive output shafts each of which is associated with at least one drive wheel, and which are coupled to the drive output shaft of the motor vehicle transmission. Advantageously, in that way a compact structure of the drive axle with the drive unit can be produced, wherein the drive output shaft of the motor vehicle transmission and the drive output shafts of the drive axle are coupled by way of a differential gearset.

In the context of the invention, at least one such drive axle is provided in a hybrid or electric vehicle, which can be a passenger car or a utility vehicle. In this case a utility vehicle can be in the form of an at least partially electrically driven transporter or a light to medium-weight bus or truck.

In the context of the invention, that two structural elements of the motor vehicle transmission in a hybrid or electric vehicle are "connected" or "coupled" or are "in connection with one another" means a permanent coupling of the said structural elements, so that they cannot rotate independently of one another. Insofar, between these structural elements, which can be shafts and/or elements of the planetary gearsets, and/or a rotationally fixed structural element of the transmission, no shifting element is provided, but rather the corresponding structural elements are coupled with one another with a fixed rotation speed ratio.

In contrast, if a shifting element is provided at least functionally between two structural elements, then these structural elements are not permanently coupled with one another, but rather coupling only takes place when the at least functionally provided intermediate shifting element is actuated. In the context of the invention, actuation of the shifting element means that the shifting element concerned is changed to a closed state so that consequently the structural elements directly coupled thereto are constrained to undergo the same rotation movement. In the case when the shifting element concerned is designed as an interlocking shifting element, then the structural elements directly connected to one another rotate at the same speed, whereas in the case of a frictional shifting element rotation speed differences can exist between the structural elements. However, in the context of the invention this desired, or even undesired condition of the structural elements concerned is called a rotationally fixed connection of those elements by way of the shifting element.

BRIEF DESCRIPTION OF THE DRAWINGS

Advantageous embodiments of the invention, which are explained below, are represented in the drawings, which show.

DETAILED DESCRIPTION

Figure 1:
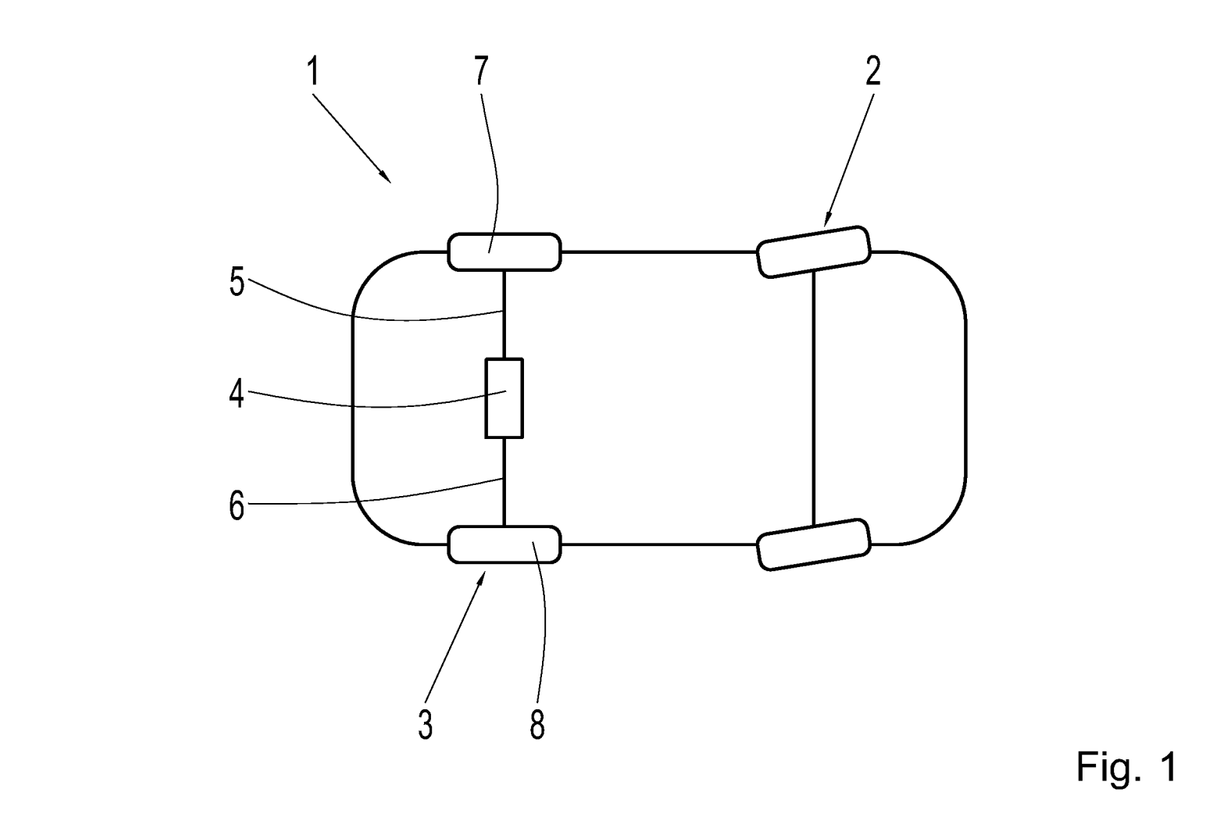
FIG. 1: A schematic representation of an electric vehicle corresponding to a preferred embodiment of the invention.

FIG. 1 shows a schematic view of an electric vehicle 1, which in particular can be an electric utility vehicle, such as a transporter. Besides a steerable, non-driven vehicle axle 2, the electric vehicle 1 also comprises a drive axle 3 with which, by means of a drive unit 4, drive wheels 7 and 8 can be driven by way of drive output shafts 5 and 6. Whereas the vehicle axle 2 is a front axle, the drive axle 3 is a rear axle of the electric vehicle 1. However, alternatively or in addition to the drive axle 3, the vehicle axle 2 could also be designed as a driven axle.

Figure 2:
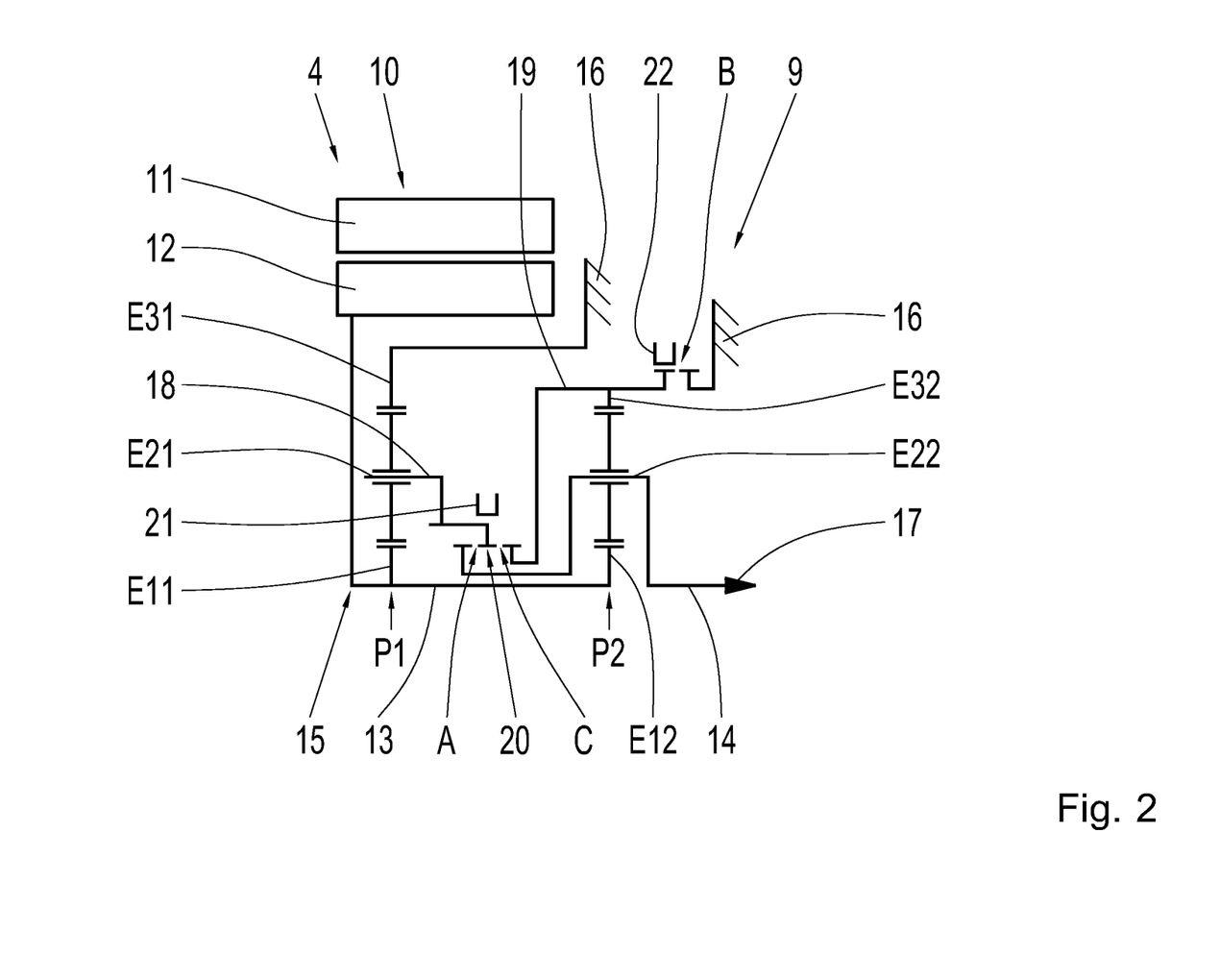
FIG. 2: A schematic view of a drive unit of the electric vehicle in FIG. 1, corresponding to a first embodiment of the invention.

In FIG. 2 the drive unit 4 in FIG. 1 is now shown in greater detail, wherein the drive unit 4 is made in accordance with a first possible design of the invention. In this case the drive unit 4 comprises a motor vehicle transmission 9 and an electric machine 10, wherein the motor vehicle transmission 9 is made in accordance with a first embodiment of the invention. In a manner whose principle is known to those familiar with the subject, the electric machine 10 consists of a stator 11 and a rotor 12, and the electric machine 10 can be operated on the one hand as a generator and on the other hand as an electric motor.

The motor vehicle transmission 9 comprises a drive input shaft 13, a drive output shaft 14 and two planetary gearsets P1 and P2, each respectively consisting of a first element E11 or E12, a second element E21 or E22 and a third element E31 or E32 in each case. The respective first element E11 or E12 of each planetary gearset P1 or P2 is a sun gear, whereas the respective second element E21 or E22 of each planetary gearset P1 or P2 is in the form of a planetary web in each case. Furthermore, the respective third element E31 or E32 of each planetary gearset P1 or P2 is a ring gear of the planetary gearset P1 or P2 concerned.

On the respective planetary web of the associated planetary gearset P1 or P2, in this case at least one planetary gearwheel is mounted to rotate, which planetary gearwheel meshes both with the associated sun gear and with the associated ring gear. Accordingly, the planetary gearsets P1 and P2 are in this case in the form of minus planetary gearsets. In the context of the invention, however, it is conceivable to design one or both planetary gearsets as plus planetary gearsets, and for that purpose, compared with the design as minus planetary gearsets, the respective second element E21 or E22 is formed by the associated ring gear and the respective third element E31 or E32 is formed by the associated planetary web. Furthermore, when the respective planetary gearsets are in the form of a plus planetary gearset as opposed to a minus planetary gearset, the stationary gear ratio is increased by one. In a plus planetary gearset, at least one planetary gearwheel pair is mounted to rotate on the planetary web, one of the planetary gearwheels of which meshes with the sun gear and one with the ring gear concerned. Moreover, the planetary gearwheels of the at least one pair of planetary gearwheels mesh with one another.

In the present case, the first element E11 of the first planetary gearset P1 and the first element E12 of the second planetary gearset P2 are connected rotationally fixed with one another by way of the drive input shaft 13, which is also in rotationally fixed connection with the rotor 12 of the electric machine 10 at a connection point 15. Accordingly, the first element E11 of the first planetary gearset P1, the first element E12 of the second planetary gearset P2, and the rotor 12 are all connected rotationally fixed to one another via the drive input shaft 13, so that the first element E11 of the first planetary gearset P1, the first element E12 of the second planetary gearset P2, and the rotor 12 always rotate at the same rotation speed. In the context of the invention, the drive input shaft 13 can be made integrally with the first element E11 of the first planetary gearset P1 and/or with the first element E12 of the second planetary gearset P2 and/or with the rotor 12 of the electric machine 10.

The third element E31 of the first planetary gearset P1 is permanently connected to a rotationally fixed structural element 16, which is a transmission housing of the motor vehicle transmission 9, part of the transmission housing or a component connected rotationally fixed thereto. Besides components of the motor vehicle transmission 9, the transmission housing preferably also accommodates the electric machine 10. By virtue of the permanent rotationally fixed connection of the third element E31 of the first planetary gearset P1 to the rotationally fixed structural element 16, the third element E31 is permanently prevented from rotating.

As can be seen in FIG. 2, the drive output shaft 14 is connected rotationally fixed to the second element E22 of the second planetary gearset P2, and in particular the drive output shaft 14 is also connected at a connection point 17 to a differential gearset—not shown in this case—of a differential gear system, by means of which, in a manner whose principle is known to those familiar with the subject, a drive power introduced by the drive output shaft 14 is distributed to the two drive output shafts 5 and 6 of the drive axle 3. In addition, the second element E21 of the first planetary gearset P1 is connected rotationally fixed to a shaft 18 and the third element E32 of the second planetary gearset P2 is connected rotationally fixed to a shaft 19.

The motor vehicle transmission 9 comprises a number of shifting elements A, B, and C, in each case in the form of interlocking shifting elements, namely unsynchronized claw-type shifting elements. Whereas the shifting element B is provided as a single shifting element, the functions of the shifting elements A and C are reproduced by a shifting device 20. The shifting device 20 has in this case a coupling element 21 which is in the form of a sliding sleeve and which by virtue of an associated actuator—not shown here—can move axially to two different shift positions in addition to a neutral position. The actuator is preferably an electro-mechanical actuator. In the first shift position of the coupling element 21, an actuated state of the shifting element A is functionally reproduced, in which state the shaft 18 and thus also the second element E21 of the first planetary gearset P1 is connected rotationally fixed to the drive output shaft 14, and therefore also to the second element E22 of the second planetary gearset P2.

In contrast, in the second shift position of the coupling element 21, the actuated state of the shifting element C is reproduced, in which the shaft 18 is connected rotationally fixed to the shaft 19. Thereby the second element E21 of the first planetary gearset P1 and the third element E32 of the second planetary gearset P2 are in rotationally fixed connection with one another and consequently they rotate together.

Also associated with the shifting element B in the form of a single shifting element there is a coupling element 22 which, by means of an actuator—again not shown—can be changed to a neutral position and to a shift position in which the coupling element 22 produces the closed state of the shifting element B. In this closed state, the shaft 19 is connected to the rotationally fixed structural element 16 and is therefore immobilized, which means that the third element E32 of the second planetary gearset P2 is also immobilized.

As can be seen in FIG. 2, the drive input shaft 13, the drive output shaft 14, and also the two planetary gearsets P1 and P2 are arranged coaxially with one another, so that besides the shaft 18 and the shaft 19, the electric machine 10 as well is positioned coaxially thereto. Axially after the connection point 15 of the drive input shaft1 13 there follow first the first planetary gearset P1, then the second planetary gearset P2, and finally the connection point 17 of the drive output shaft 14. In this case, the electric machine 10 is axially essentially in a plane with the first planetary gearset P1, which is located radially inside the electric machine 10.

The shifting device 20 is arranged axially between the first planetary gearset P1 and the second planetary gearset P2, in such manner that the shifting device 20 is located axially overlapping the electric machine 10 and also radially inside the latter. On the other hand, the second shifting element B is located axially between the second planetary gearset P2 and the connection point 17, and thus axially on a side of the second planetary gearset P2 that faces away from the first planetary gearset P1.

Whereas the drive input shaft 13 is essentially in the form of a solid shaft and extends starting from the connection point 15 as far as the second planetary gearset P2, the two shafts 18 and 19 are hollow shafts. In this case, the shaft 18 extends axially between the first planetary gearset P1 and the shifting device 20, whereas the shaft 19 extends axially starting from the shifting device 20 to beyond the second planetary gearset P2 in order to be able, by means of the shifting element B in its closed state, to form a rotationally fixed connection to the rotationally fixed structural element 16. The drive output shaft 14, too, is in the form of a hollow shaft extending between the shifting device 20 and the second planetary gearset P2, but on a side of the second planetary gearset P2 facing axially away from the shifting device 20 it can then be at least partially in the form of a solid shaft.

Figure 3:
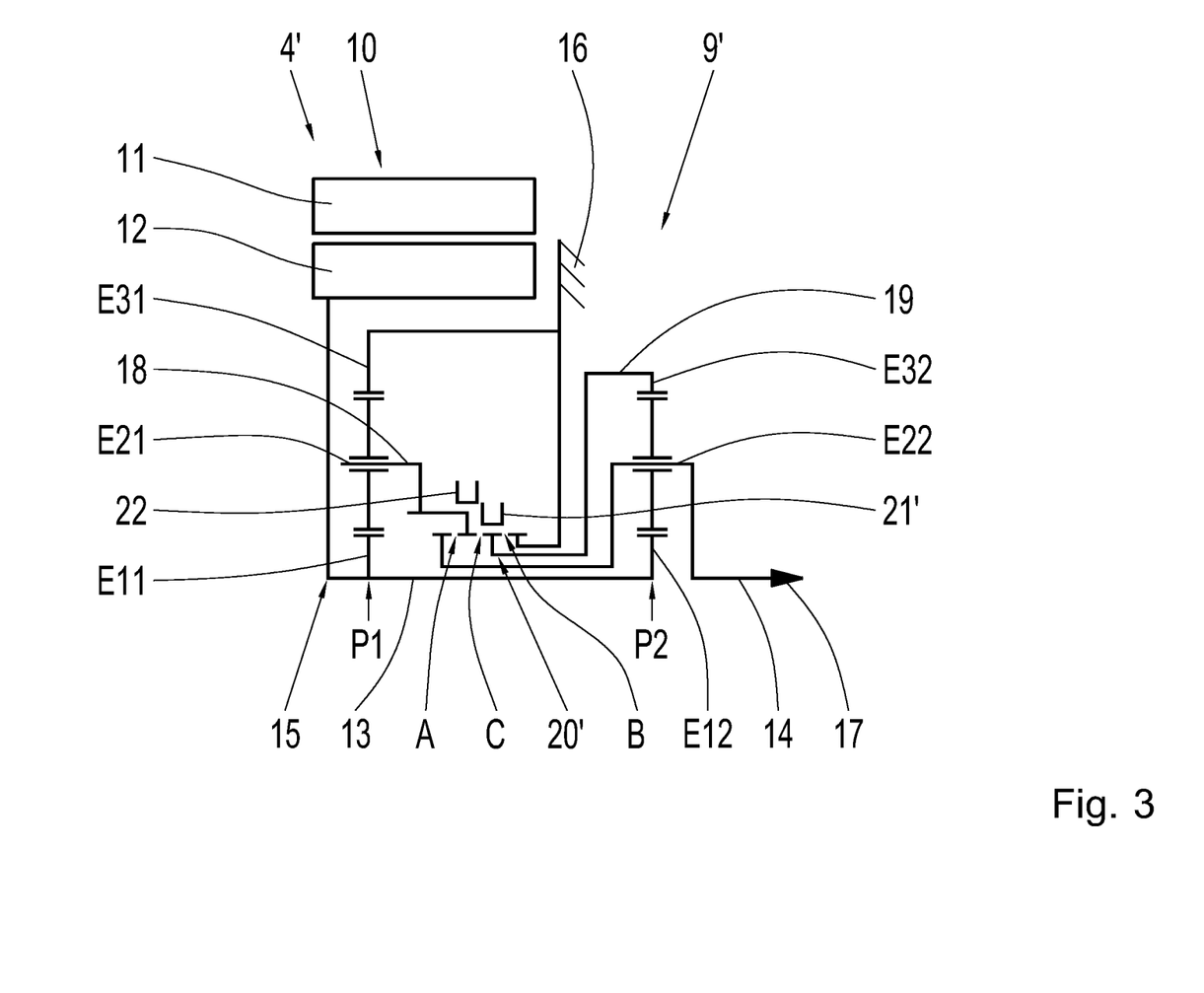
FIG. 3: A schematic representation of a drive unit according to a second possible embodiment of the invention.

FIG. 3 shows a schematic representation of a drive unit 4' connecting to a second possible design of the invention, which can also be used in the drive axle 3 of the electric vehicle 1 shown in FIG. 1. This drive unit 4' corresponds essentially to the previous variant according to FIG. 2, with the difference that a shifting device 20' of a motor vehicle transmission 9' of this drive unit 4' now reproduces the functions of the shifting element B and the shifting element C. For that purpose, a coupling element 21' of the shifting device 20', besides a shift position that produces the closed state of the shifting element C, and besides a neutral position, can be moved to a shift position in which the closed state of the shifting element B is obtained. In that shift condition, the shaft 19 is immobilized, so that the third element E32 of the second planetary gearset P2 is prevented from rotating. For the various couplings the shaft 19 extends in the form of a hollow shaft axially between the shifting device 20' and the second planetary gearset P2. Furthermore, the shifting element A is now in the form of a single shifting element with which a coupling element 22 is associated. This coupling element 22 can be moved by an actuator—not shown here—to a shift position in which the closed state of the shifting element A is produced so that the shaft 18 is connected rotationally fixed to the drive output shaft 14. Here, the shifting element A is positioned axially between the first planetary gearset P1 and the shifting device 20'. In other respects, the drive unit 4' in FIG. 3 corresponds to the drive unit 4 in FIG. 2, so that reference can be made to the description of the latter.

Figure 4:
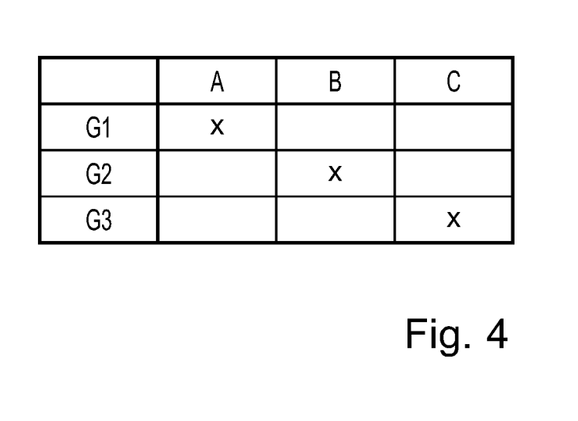
FIG. 4: An example of a shifting scheme of a particular motor vehicle transmission of the drive units shown in FIGS. 2 and 3.

Furthermore, FIG. 4 shows an example of a shifting scheme of the motor vehicle transmissions 9 and 9' in FIGS. 2 and 3, such that this is provided for a design of the respective motor vehicle transmission 9 or 9' in which the first planetary gearset P1 has a quantitatively higher stationary gear ratio than the second planetary gearset P2.

In FIG. 4 it can be seen that a first gear G1, a second gear G2, and a third gear G3 can be engaged, and in the table of FIG. 4 it is indicated by an X which of the shifting elements A, B, and C has to be actuated to do this in each case. In this case, the first gear G1 between the drive input shaft 13 and the drive output shaft 14 is obtained by closing the shifting element A, whereby the shaft 18 is connected rotationally fixed to the drive output shaft 14 and thereby the drive input shaft 13 is coupled to the drive output shaft 14 by way of the first planetary gearset P1. On the other hand, the second planetary gearset P2 is free from load, so that good efficiency can be achieved in the first gear G1.

In contrast, to engage the second gear G2, the shifting element B has to be closed, whereby the shaft 19 and hence also the third element E32 of the second planetary gearset P2 are immobilized. Consequently, the drive input shaft 13 is coupled to the drive output shaft 14 by way of the second planetary gearset P2, while the first planetary gearset P1 is free from load so that good efficiency is again achieved.

To obtain the third gear G3, the shifting element C is closed, so that the shaft 18 and the shaft 19 are connected rotationally fixed to one another. This brings about a coupling of the drive input shaft 13 to the drive output shaft 14 by way of both planetary gearset P1 and P2.

Figure 5:
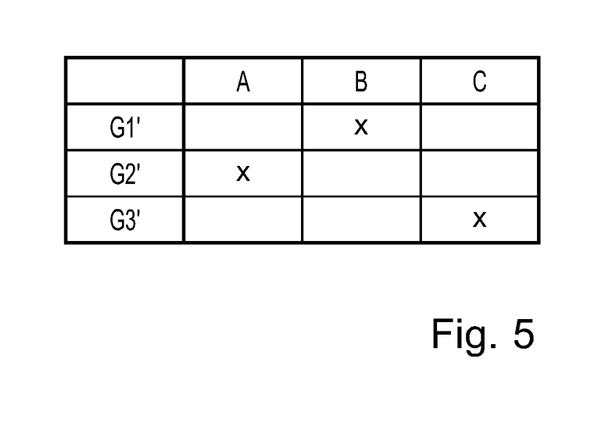
FIG. 5: An alternative example shifting scheme of a particular motor vehicle transmission of the drive units shown in FIGS. 2 and 3.

Finally, FIG. 5 shows an alternative example shifting scheme of the motor vehicle transmissions 9 and 9' in FIGS. 2 and 3. This is associated with a design of the respective motor vehicle transmission 9 or 9' in which the first planetary gearset P1 has a quantitatively lower stationary gear ratio than the second planetary gearset P2. With this variant, too, three different gears G1' to G3' can be engaged, and in FIG. 5 it is indicated by an X which of the shifting elements A, B and C has to be actuated in each case.

Thus, the first gear G1' is engaged by closing the shifting element B, which results in immobilization of the shaft 19 and hence also of the third element E32 of the second planetary gearset P2. Thereby, the drive input shaft 13 is coupled to the drive output shaft 14 by way of the second planetary gearset P2, while the first planetary gearset P1 is free from load. Accordingly, good efficiency can be achieved in the first gear G1'.

The second gear G2' is obtained by closing the shifting element A. This brings about a rotationally fixed connection of the shaft 18 to the drive output shaft 14, whereby the drive input shaft 13 is coupled to the drive output shaft 14 by way of the first planetary gearset P1. At the same time the second planetary gearset P2 is free from load, so that again good efficiency can be achieved in the second gear G2'.

To engage the third gear G3' the shifting element C has to be closed, so that the shaft 18 and the shaft 19 are connected rotationally fixed to one another. Consequently, the drive input shaft 13 is coupled to the drive output shaft1 4 by way of both planetary gearsets P1 and P2.

By virtue of the designs of a motor vehicle transmission in accordance with the invention a suitable integration of a drive machine can be achieved with a smaller number of shifting elements.

INDEXES

1 Electric vehicle
2 Vehicle axle
3 Drive axle
4, 4' Drive unit
5 Drive output shaft
6 Drive output shaft
7 Drive wheel
8 Drive wheel
9, 9' Motor vehicle transmission
10 Electric machine
11 Stator
12 Rotor
13 Drive input shaft
14 Drive output shaft
15 Connection point
16 Rotationally fixed structural element
17 Connection point
18 Shaft
19 Shaft
20, 20' Shifting device
21, 21' Coupling element
22 Coupling element
P1 First planetary gearset
P2 Second planetary gearset
E11 First element of the first planetary gearset
E21 Second element of the first planetary gearset
E31 Third element of the first planetary gearset
E12 First element of the second planetary gearset
E22 Second element of the second planetary gearset
E32 Third element of the second planetary gearset
A Shifting element
B Shifting element
C Shifting element
G1 Gear
G2 Gear
G3 Gear
G1' Gear
G2' Gear
G3' Gear

The invention claimed is:

1. A motor vehicle transmission for an at least partially electrically driven motor vehicle, the motor vehicle transmission comprising:
a drive input shaft configured for coupling to an electric machine;
a drive output shaft;
a first planetary gearset and a second planetary gearset each comprising a first element, a second element, and a third element, respectively, in the form of a sun gear, a planetary web, and a ring gear, wherein the first element of the first planetary gearset is connected rotationally fixed to the drive input shaft and the third element of the first planetary gearset is immobilized, and wherein the second element of the second planetary gearset is connected rotationally fixed to the drive output shaft; and
a first shifting element, a second shifting element, and a third shifting element, wherein:
the drive input shaft is connected rotationally fixed to the first element of the second planetary gearset;
the first shifting element is configured, in a closed state, to connect the second element of the first planetary gearset rotationally fixed to the drive output shaft;
the second shifting element is configured, in a closed state, to immobilize the third element of the second planetary gearset; and
the third shifting element is configured, in a closed state, to connect the second element of the first planetary gearset rotationally fixed to the third element of the second planetary gearset.

2. The motor vehicle transmission according to claim 1, wherein individual shifting elements of the first shifting element, the second shifting element, and the third shifting element, are in the form of interlocking shifting elements.

3. The motor vehicle transmission according to claim 2, wherein the interlocking shifting element are configured as unsynchronized claw-type shifting elements.

4. The motor vehicle transmission according to claim 2, wherein first shifting element and the third shifting element are formed by a shifting device having a coupling element configured to be moved to a first shift position and to a second shift position, wherein:
in the first shift position, the coupling element actuates the first shifting element and connects the second element of the first planetary gearset rotationally fixed to the drive output shaft, and
in the second shift position, the coupling element actuates the third shifting element and connects the second element of the first planetary gearset rotationally fixed to the third element of the second planetary gearset.

5. The motor vehicle transmission according to claim 2, wherein the second shifting element and the third shifting element are formed by a shifting device having a coupling element configured to be moved to a first shift position and to a second shift position, wherein:
in the first shift position the coupling element actuates the second shifting element and immobilizes the third element of the second planetary gearset, and
in the second shift position the coupling element actuates the third shifting element and connects the second element of the first planetary gearset and the third element of the second planetary gearset rotationally fixed to one another.

6. The motor vehicle transmission according to claim 1, wherein the first and second planetary gearsets are arranged axially at a connection point which serves for coupling the drive input shaft to the drive machine, axially in a sequence of the first planetary gearset followed by the second planetary gearset.

7. The motor vehicle transmission according to claim 6, wherein the first shifting element and the third shifting element are arranged axially between the first planetary gearset and the second planetary gearset.

8. The motor vehicle transmission according to claim 6, wherein the second shifting element is located axially on a side of the second planetary gearset facing away from the first planetary gearset.

9. The motor vehicle transmission according claim 6, wherein second shifting element is arranged axially between the first planetary gearset and the second planetary gearset.

10. The motor vehicle transmission according to claim 1, wherein the first planetary gearset has quantitatively a higher stationary gear ratio than the second planetary gearset.

11. A method for operating a motor vehicle transmission according to claim 10, the method comprising:
engaging a first gear between the drive input shaft and the drive output shaft when the first shifting element is closed;
engaging a second gear between the drive input shaft and the drive output shaft when the second shifting element is closed; and
engaging a third gear between the drive input shaft and the drive output shaft when the third shifting element is closed.

12. The motor vehicle transmission according to claim 1, wherein the first planetary gearset has quantitatively a lower stationary gear ratio than the second planetary gearset.

13. A method for operating a motor vehicle transmission according to claim 12, the method comprising:
engaging a first gear between the drive input shaft and the drive output shaft when the second shifting element is closed;
engaging a second gear between the drive input shaft and the drive output shaft when the first shifting element is closed; and
engaging a third gear between the drive input shaft and the drive output shaft when the third shifting element is closed.

14. A drive unit for an at least partially electrically driven motor vehicle, the drive unit comprising:
an electric machine with a rotor; and
a motor vehicle transmission according to claim 1, wherein the rotor of the electric machine is coupled to the drive input shaft of the motor vehicle transmission.

15. The drive unit according to claim 14, wherein the first planetary gearset of the motor vehicle transmission is arranged axially at least partially overlapping and radially inside the rotor of the electric machine.

16. A drive axle for a hybrid or electric vehicle, comprising a drive unit according to claim 14.

17. A hybrid or electric vehicle comprising at least one drive axle according to claim 16 or at least one drive unit according to claim 14.

* * * * *

UNITED STATES PATENT AND TRADEMARK OFFICE
CERTIFICATE OF CORRECTION

| | | |
|---|---|---|
| PATENT NO. | : 12,123,483 B2 | Page 1 of 1 |
| APPLICATION NO. | : 18/240540 | |
| DATED | : October 22, 2024 | |
| INVENTOR(S) | : Johannes Kaltenbach et al. | |

It is certified that error appears in the above-identified patent and that said Letters Patent is hereby corrected as shown below:

In the Claims

In Claim 17, Column 16, Lines 30-31, delete "or at least one drive unit according to claim 14".

Signed and Sealed this
Twenty-first Day of January, 2025

Coke Morgan Stewart
*Acting Director of the United States Patent and Trademark Office*